US008239661B2

(12) United States Patent
Abernathy et al.

(10) Patent No.: US 8,239,661 B2
(45) Date of Patent: *Aug. 7, 2012

(54) SYSTEM AND METHOD FOR DOUBLE-ISSUE INSTRUCTIONS USING A DEPENDENCY MATRIX

(75) Inventors: Christopher M. Abernathy, Austin, TX (US); Mary D. Brown, Ausin, TX (US); Todd A. Venton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 859 days.

This patent is subject to a terminal disclaimer.

(21) Appl. No.: 12/199,853

(22) Filed: Aug. 28, 2008

(65) Prior Publication Data

US 2010/0058035 A1  Mar. 4, 2010

(51) Int. Cl.
*G06F 15/00* (2006.01)
*G06F 9/30* (2006.01)
*G06F 9/40* (2006.01)
*G06F 7/38* (2006.01)
*G06F 9/00* (2006.01)
*G06F 9/44* (2006.01)

(52) U.S. Cl. .............................. 712/214; 712/220
(58) Field of Classification Search .................. None
See application file for complete search history.

(56) References Cited

U.S. PATENT DOCUMENTS

| | | | |
|---|---|---|---|
| 5,201,057 A * | 4/1993 | Uht | 712/18 |
| 5,655,096 A * | 8/1997 | Branigin | 712/200 |
| 6,016,540 A * | 1/2000 | Zaidi et al. | 712/214 |
| 6,065,105 A | 5/2000 | Zaidi et al. | |
| 6,216,200 B1 * | 4/2001 | Yeager | 711/100 |
| 6,334,182 B2 | 12/2001 | Merchant et al. | |
| 6,988,183 B1 * | 1/2006 | Wong | 712/208 |
| 7,085,917 B2 | 8/2006 | Busaba et al. | |
| 2003/0061466 A1 * | 3/2003 | Samra et al. | 712/217 |
| 2003/0191925 A1 | 10/2003 | Ernst et al. | |
| 2006/0271820 A1 | 11/2006 | Mack et al. | |
| 2008/0028183 A1 * | 1/2008 | Hwu et al. | 712/20 |

OTHER PUBLICATIONS

Sassone et al., Matrix Scheduler Reloaded, pp. 335-346, May 2007.*
IBM DOSS: AUS920060776, Nguyen et al., "System and Method for Predictive Early Allocation of Stores in a Microprocessor".
IBM DOSS: YOR920060449, Kailas et al., "Method and System for Partial On-Demand Register Renaming and Out-Of-Order Execution".

* cited by examiner

*Primary Examiner* — Eddie P Chan
*Assistant Examiner* — George Giroux
(74) *Attorney, Agent, or Firm* — Patrick E. Caldwell, Esq.; The Caldwell Firm, LLC

(57) ABSTRACT

A method for double-issue complex instructions receives a complex instruction comprising a first portion and a second portion. The method sets a single issue queue slot and allocates an execution unit for the complex instruction, and identifies dependencies in the first and second portions. The method sets a dependency matrix slot and a consumers table slot for the first and section portion. In the event the first portion dependencies have been satisfied, the method issues the first portion and then issues the second portion from the single issue queue slot. In the event the second portion dependencies have not been satisfied, the method cancels the second portion issue.

20 Claims, 5 Drawing Sheets

SYSTEM AND METHOD FOR DOUBLE-ISSUE INSTRUCTIONS USING A DEPENDENCY MATRIX

TECHNICAL FIELD

The present invention relates generally to the field of computer architecture and processing and, more particularly, to a system and method for double-issue instructions using a dependency matrix.

BACKGROUND OF THE INVENTION

Modern electronic computing systems, such as microprocessor systems, typically include a processor and datapath configured to receive and process instructions. Generally, instructions are either "simple" or "complex." Typical simple instructions encompass a single operation, such as, for example, a load or store from memory. Common Reduced Instruction Set Computers (RISC) employ simple instructions exclusively. Complex instructions typically encompass more than one single operation, such as an add/store, for example. Common Complex Instruction Set Computers (CISC) employ complex instructions and sometimes also employ simple instructions. Both simple and complex instructions are subject to dependencies.

Generally, a dependency occurs where an instruction requires data from sources that are themselves the result of another instruction. For example, in the instruction sequence:
ADD $8, $7, $5
SW $9, (0)$8
The ADD (add) instruction adds the contents of register $7 to the contents of register $5 and puts the result in register $8. The SW (store word) instruction stores the contents of register $9 at the memory location address found in $8. As such, the SW instruction must wait for the ADD instruction to complete before storing the contents of register $8. The SW instruction therefore has a dependency on the ADD instruction. The illustrated dependency is also known as a read-after-write (RAW) dependency.

One common approach to tracking dependencies is a "dependency matrix," such as that described in U.S. Pat. Nos. 6,065,105 and 6,334,182. Generally, a conventional dependency matrix includes rows and columns. Each bit or element, i.e., the intersection of one row and one column, corresponds to a dependency of an instruction in the issue queue. Each instruction in the issue queue is associated with a particular row in the dependency matrix, with the read-after-write (RAW) dependencies noted by bits set on a given column within that row.

As a given resource becomes available, the dependency matrix clears the column associated with that resource, setting all locations in the column to zero. Once a given instruction (row) has all of its RAW dependencies resolved, i.e. once all columns in that row have been set to zero, then the instruction is ready to issue.

As new instructions enter the issue queue, allocation logic assigns the new instructions to a position within the dependency matrix. The dependency matrix logic checks sources for that instruction against a destination register file. A match between an entering instruction's source and a pending instruction's destination indicates that the entering instruction is dependent on the pending entry, and the dependency matrix logic sets the bit in the appropriate position in the dependency matrix. The newly entered instruction will not issue from the issue queue until after the instruction on which it depends has issued, as indicated by the dependency matrix.

Conventional dependency matrices can only handle an instruction that needs to issue only once. This limits the speed and functionality of a system using conventional dependency matrices, because an instruction that needs to be utilized multiple times must be reinserted into the dependency matrix each time the instruction is needed. This increases the total time necessary to execute the instruction.

For example, as described above, complex instructions involve multiple parts. In systems using conventional dependency matrices, these instructions must be cracked into separate instructions, assigning each resultant separate instruction to a separate position within the dependency matrix and the issue queue, thereby limiting the quantity of instructions that can be issued in a given time period by the dependency matrix. Further, cracking the instruction requires that the dependency matrix be overwritten for the second instruction. Additionally, the system must perform extra source-completion compares in order to execute the second instruction, which also increases the time and power required to execute the original instruction.

Therefore, there is a need for a system and/or method for double issuing instructions using a dependency matrix that addresses at least some of the problems and disadvantages associated with conventional systems and methods.

BRIEF SUMMARY

The following summary is provided to facilitate an understanding of some of the innovative features unique to the embodiments disclosed and is not intended to be a full description. A full appreciation of the various aspects of the embodiments can be gained by taking into consideration the entire specification, claims, drawings, and abstract as a whole.

A method receives a complex instruction comprising a first portion and a second portion. The method sets a single issue queue slot and allocates an execution unit (or units) for the complex instruction, and identifies dependencies in the first and second portions. The method sets a dependency matrix slot and a consumers table slot for the first and section portion. In the event the first portion dependencies have been satisfied, the method issues the first portion and then issues the second portion from the single issue queue slot. In the event the second portion dependencies have not been satisfied, the method cancels the second portion issue.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
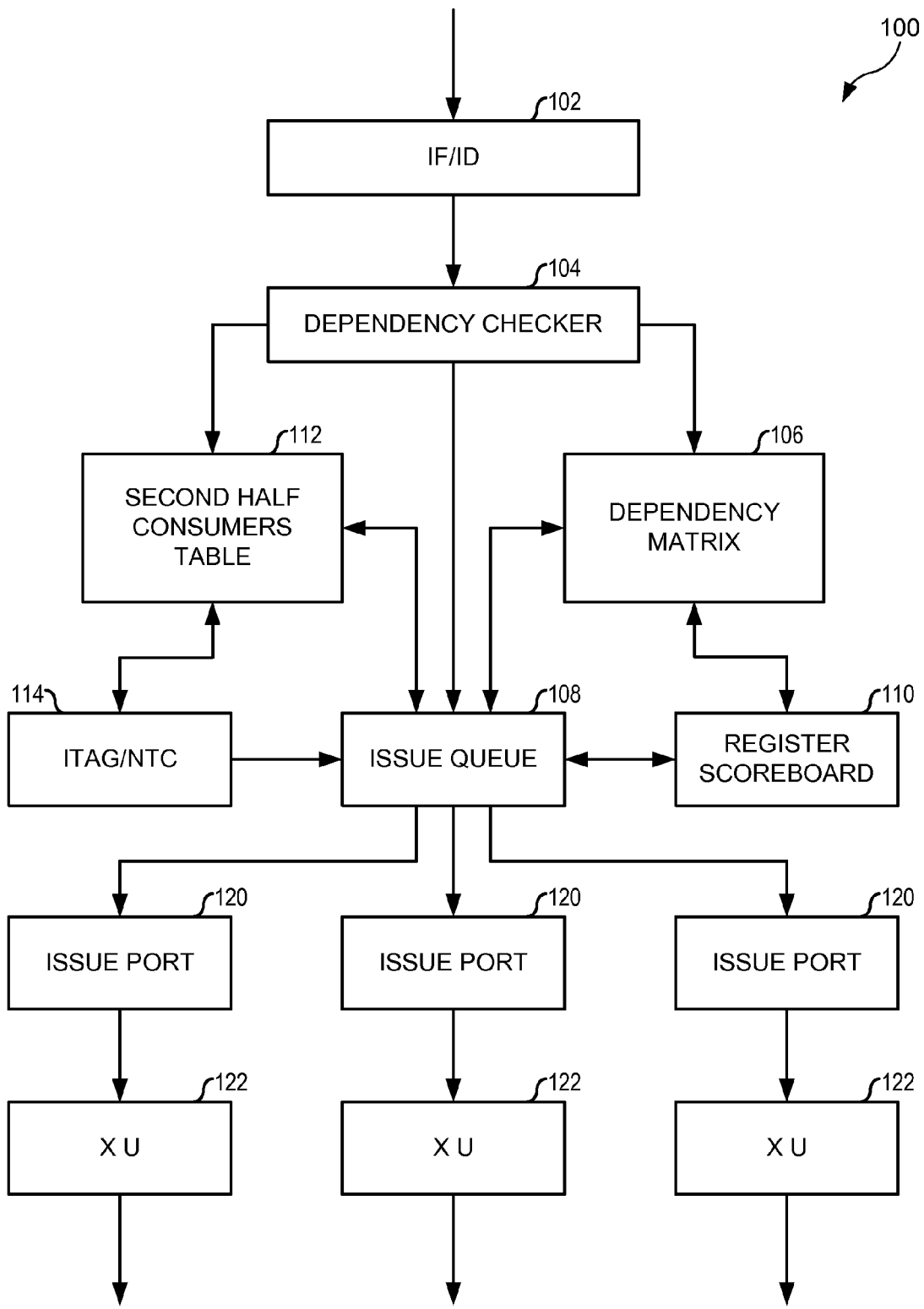
FIG. 1 illustrates a block diagram showing a system for double-issue complex instructions in accordance with a preferred embodiment.

The particular values and configurations discussed in these non-limiting examples can be varied and are cited merely to illustrate at least one embodiment and are not intended to limit the scope of the invention.

In the following discussion, numerous specific details are set forth to provide a thorough understanding of the present invention. Those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

Referring now to the drawings, FIG. 1 is a high-level block diagram illustrating certain components of a system 100 for double issuing instructions using a dependency matrix, in accordance with one embodiment of the invention. In the illustrated embodiment, system 100 comprises: an instruction fetch/instruction decode (IF/ID) module 102, a dependency checker 104, a second half consumers table 112, a dependency matrix 106, an issue queue 108, a register scoreboard 110, an instruction tag/next to complete (ITAG/NTC) comparator 114, one or more issue ports 120, and one or more execution units 122.

In the illustrated embodiment, IF/ID module 102 is an otherwise conventional retrieval and decoding module for fetching and decoding instructions. In the illustrated embodiment, dependency checker 104 is an otherwise conventional dependency checker, modified as described below. Generally, dependency checker 104 compares source and destination information among the instructions decoded by IF/ID module 102, to identify dependencies in the instructions, if any. Dependency checker 104 forwards the instruction to issue queue 108. Dependency checker 108 also forwards identified dependency information to dependency matrix 106 and second half consumers table 112, as described in more detail below.

For complex instructions, dependency checker 104 also identifies a first half and a second half of the complex instruction. Generally, in one embodiment, the first half of a complex instruction is that portion of the complex instruction preferred to issue before any other portion of the complex instruction. For example, the first portion can be that portion of the complex instruction that serves to acquire an important resource, or that portion of the complex instruction that improves overall performance when issued first. Dependency checker 104 forwards the first half dependency information to dependency matrix 106, and the second half dependency information to second half consumers table 112.

In the illustrated embodiment, dependency matrix 106 is an otherwise conventional dependency matrix, modified as described below. Generally, dependency matrix 106 tracks identified dependencies and identified first half dependencies, as described below.

In the illustrated embodiment, issue queue 108 is an otherwise conventional issue queue, modified as described below. Generally, issue queue 108 stores instructions prior to issue for execution by a specific execution unit. In the illustrated embodiment, instruction queue 108 issues instructions to an issue port 120 coupled to an execution unit 122. Issue port 120 is an otherwise conventional issue port, and execution unit 122 is an otherwise conventional execution unit. One skilled in the art will understand that execution unit 122 can be any suitable execution unit, such as a floating point unit (FPU) or fixed point unit (FXU), for example.

In the illustrated embodiment, register scoreboard 110 is an otherwise conventional register scoreboard, modified as described below. Generally, register scoreboard 110 tracks source information upon which instructions depend, as described below.

As described above, system 100 includes second half consumers table 112. Generally, second half consumers table 112 tracks and stores second half dependencies information, as described below.

In the illustrated embodiment, ITAG/NTC comparator 114 is an otherwise conventional comparator, modified as described below. Generally, ITAG/NTC comparator compares instruction tag (ITAG) information of an instruction against the ITAG information of the next-to-complete (NTC) instruction.

In a general exemplary operation in accordance with one embodiment, IF/ID 102 fetches and decodes an instruction, and forwards the instruction to dependency checker 104. Dependency checker 104 identifies complex instructions and, for identified complex instructions, identifies a first half of the complex instruction and a second half of the complex instruction. Dependency checker 104 forwards first half dependency information to dependency matrix 106, forwards second half dependency information to second half consumers table 112, and forwards the instruction to issue queue 108. In one embodiment, dependency checker 104 also identifies dependencies in simple instructions, forwarding dependency information to dependency matrix 106, and forwarding the simple instruction to issue queue 108. In one embodiment, first half dependency information and second half dependency information also indicate that the subject instruction has no dependencies, if applicable.

Dependency matrix 106 assigns the first half dependency information to a slot within dependency matrix 106 based on the issue queue slot, the first half of the instruction, and the first half dependencies. Similarly, the second half consumers table 112 assigns the second half dependency information to a slot within the second half consumers table 112 based on the issue queue slot, the second half of the instruction, and the second half dependencies.

Periodically, whenever issue queue 108 determines which instruction to issue next, issue queue 108 checks dependency matrix 106 to determine whether there are any remaining unresolved dependencies. Generally, as used herein, an "unresolved" dependency is a dependency wherein at least one source is not available. If dependency matrix 106 indicates that there are remaining unresolved dependencies, issue queue 108 delays the first half of the instruction for one cycle, and processes the next instruction in the queue after the first half of the instruction. If the first half instruction has no remaining unresolved dependencies indicated in dependency matrix 106, and otherwise meets the issue algorithm criteria, issue queue 108 forwards the first half of the instruction, from the issue queue slot, to the appropriate issue port 120 for the target execution unit 122. Issue queue 108 then checks register scoreboard 110 to determine whether the sources upon which the first half of the instruction depends (the "first half sources") are available according to register scoreboard 110. If the first half sources are not available, issue queue 108 cancels ("squashes") execution of the first half of the instruction. If the first half sources are available, issue queue 108 does not squash execution of the first half of the instruction.

Once the first half of the instruction issues, second half consumers table 112 marks the second half of the instruction as eligible for issue. Issue queue 108 selects and issues the second half of the instruction without checking the availability of the sources upon which the second half of the instruction depends (the "second half sources"), as described in more detail below. After the second half of the instruction issues, issue queue 108 checks the availability of the second half sources in register scoreboard 110. If the second half sources are available, then issue queue 108 removes the entire complex instruction, clearing the issue queue 108 slot in which the complex instruction resided. If the second half sources are not available, issue queue 108 squashes the second half instruction issue and marks the second half of the instruction eligible for re-issue at a later time.

In the illustrated embodiment, issue queue 108 issues (and re-issues) the second half of the instruction in one of three ways. First, in one embodiment, issue queue 108 forwards the second half of the instruction to an open slot in the issue port 120 assigned to the second half of the instruction. In this embodiment, issue queue 108 does not check register scoreboard 110 for the availability of any of the second half sources. Specifically, in this embodiment, when a hole exists in an issue port 120, no other instructions are available for issue to that issue port. Further, in one embodiment, issue queue 108 marks the second half of the instruction as ready to issue, with a lower priority than instructions in the dependency matrix, and issues the second half of the instruction when there are no ready instructions in the dependency matrix. One skilled in the art will appreciate that no performance is lost because there are no other instructions available for issue to that issue port 120.

Second, in one embodiment, issue queue 108 delays issue of the second half of the instruction until the second half of the instruction is NTC. Once the second half of the instruction is NTC, all sources upon which it could possibly depend will be available, because all other earlier instructions will have issued. Therefore, in one embodiment, issue queue 108 does not check register scoreboard 110 to determine whether the second half sources are available. Further, in one embodiment, issue queue 108 marks the second half of the instruction as ready when the second half of the instruction is NTC, and issues the second half of the instruction before more recent instructions in the dependency matrix.

Third, in one embodiment, issue queue 108 employs ITAG/NTC comparator 114. In one embodiment, when the second half's producer (the instruction providing the second half source) is completing, then issue queue 108 marks the second half consumer (the second half of the instruction) as ready to issue, as its data at that point will be committed. Generally, this approach offers better performance than waiting until the second half of the instruction itself is NTC, since the second half may potentially issue earlier, before it is NTC. This is especially true if there are many instructions between the producer and the second half consumer. As such, in some cases, this allows the double-issue instruction's issue queue entry to free up earlier (along with any other resources potentially needed) for other instructions.

Specifically, in one embodiment, second half consumers table 112 stores the instruction tag (ITAG) identifying the instruction that the second half depends upon (the "producer"). In one embodiment, issue queue 108 maintains a list of ITAGs, indicating the ITAG of the instruction. Generally, in one embodiment, before issuing certain serializing instructions to an issue port 120, issue queue 108 uses ITAG/NTC comparator 114 to determine whether that particular instruction's ITAG matches the NTC ITAG. Further, in one embodiment, certain instructions (simple or complex) are serializing instructions, which are special instructions arranged in a particular order, such as a sync instruction, for example.

In this embodiment, if a given complex instruction is not serializing, second half consumers table 112 does not feed that given instruction's ITAG to the comparator; instead, second half consumers table 112 feeds the comparator the ITAG of the producer that feeds the second half of the given complex instruction. If the producer's ITAG matches the NTC ITAG, and the NTC ITAG has finished, this indicates that the producer is available, and the second half of the instruction can now issue. Further, in one embodiment, issue queue 108 marks the second half of the instruction as ready when the second half's producer is NTC and finishing, and issues the second half of the instruction before more recent instructions in the dependency matrix.

Thus, in one embodiment, once an instruction is available for issue, issue queue 108 transmits the instruction to an issue port 120, if available, where the instruction is forwarded to an execution unit 122. Accordingly, system 100 illustrates, at a high level, a system and method for double-issuing instructions using a dependency matrix. More specifically, in one embodiment, dependency matrix 106 and consumers table 112 generally interact as described in FIG. 2.

Figure 2:
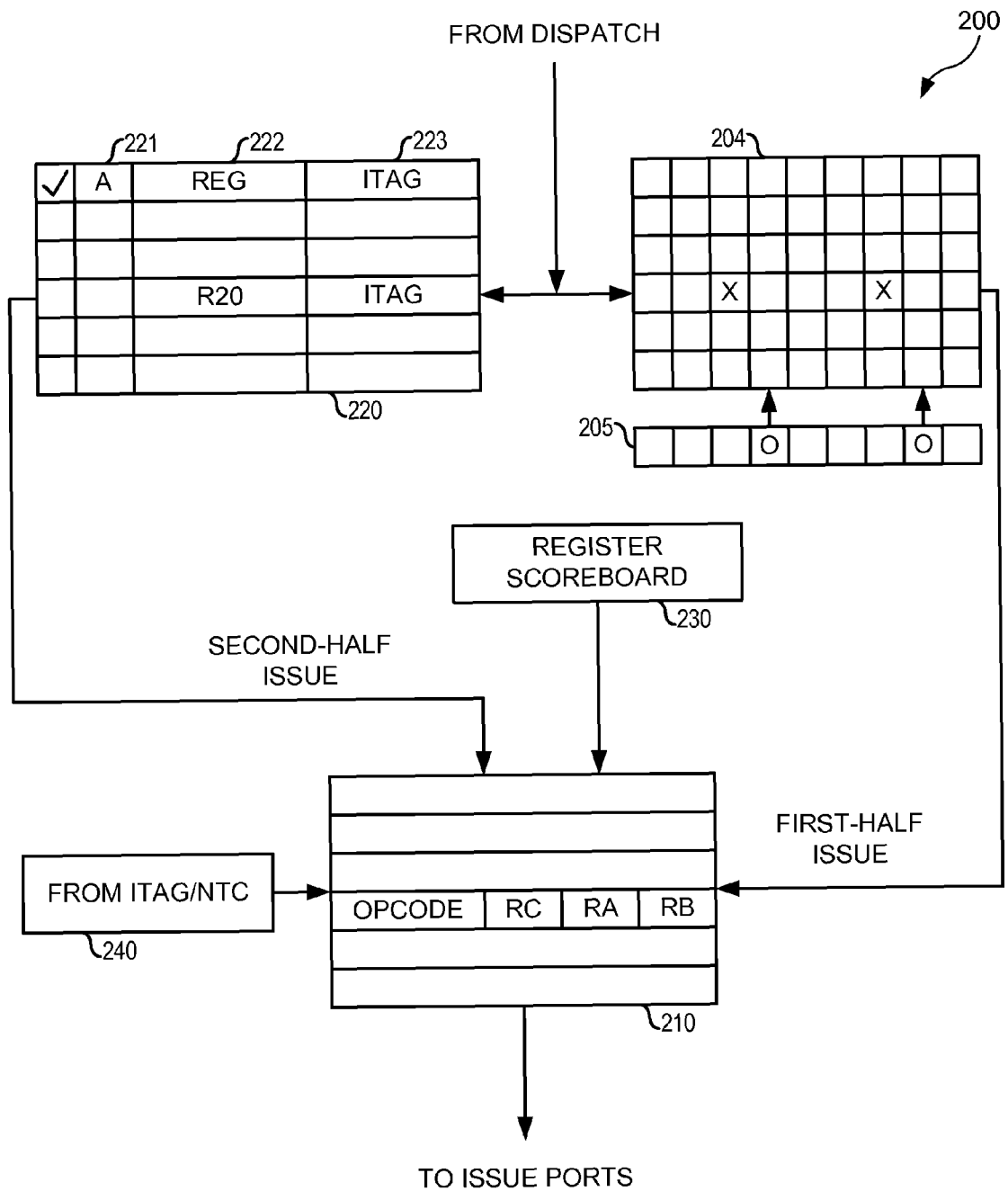
FIG. 2 illustrates a block diagram showing a system for double-issue complex instructions in accordance with a preferred embodiment.

FIG. 2 illustrates a system 200 in accordance with a preferred embodiment of the present invention. As illustrated, system 200 comprises a dependency matrix 204, an issue queue 210, a consumers table 220, and a register scoreboard 230.

In the illustrated embodiment, issue queue 210 is an otherwise conventional issue queue, modified as described below. In the illustrated embodiment, issue queue 210 comprises a series of six slots for ease of illustration. One skilled in the art will understand that an issue queue can be comprised of any number of slots, and that typical issue queues contain slots in multiples of eight. Generally, in one embodiment, the slots of issue queue 210 are numbered positions in which the instructions sent by dispatch are stored.

In the illustrated embodiment, dependency matrix 204 is an otherwise conventional dependency matrix, modified as described below. Dependency matrix 204 comprises a grid of intersecting rows and columns. Generally, each row corresponds to an associated slot of issue queue 210. Similarly, each column corresponds to an associated slot of issue queue 210. A bit in the location of the intersection of any particular row with another column indicates that the instruction assigned to that particular slot within issue queue 210 is dependent upon the instruction in issue queue 210 corresponding to the particular column. For example, the instruction at slot four of issue queue 210 is dependent upon the instructions at slots three and seven.

In the illustrated embodiment, second half consumers table 220 also comprises a series of rows and columns. Generally, each row corresponds to an associated slot of issue queue 210. Column A 221 corresponds to the eligibility of the second half of the instruction stored in that row. In one embodiment, column A 221 is a "ready" bit. Column REG 222 corresponds to the register upon which the second half of the instruction depends. Column ITAG 223 corresponds to the ITAG information of the first half of the instruction, which is sent with the second half of the instruction by dispatch. In an alternate embodiment, column ITAG 223 corresponds to the ITAG information of the producer of the second half sources of the instruction stored in that row.

In the illustrated embodiment, register scoreboard 203 is an otherwise conventional register scoreboard. Generally, register scoreboard 230 comprises a series of entries that correspond to the registers used by the instructions. In one embodiment, each entry in register scoreboard 230 indicates whether the corresponding register's data is ready to be read/used by other instructions.

In an exemplary operation of the illustrated embodiment, issue queue 210 receives from dispatch a complex instruction comprising a first half and a second half. In the illustrated embodiment issue queue 210 assigns the received complex instruction to the fourth position in issue queue 210.

In the illustrated embodiment, dispatch also forwards the first half dependency information to dependency matrix 204. As illustrated, dependency matrix 204 assigns the first half of instruction to a row in dependency matrix 204 corresponding to the instruction's row in issue queue 210. In the illustrated embodiment, dependency matrix 204 assigns the first half dependency information to row four.

As illustrated, each row of dependency matrix 204 comprises a plurality of bits corresponding to resources that produce sources for the instructions. Specifically, in one embodiment, the bits in dependency matrix 204 correspond to other rows in issue queue 210. In one embodiment, the first half dependency information indicates which bits to set, at dispatch, and correspond to the first half of the instruction's RAW dependencies.

When a resource becomes available, dependency matrix 204 clears the bit indicating that dependency. In one embodiment, a "one" or logic high bit indicates a dependency, and dependency matrix 204 "clears" that bit by setting it to "zero" or logic low. When all of the bits indicating dependencies of the first half instruction have been cleared, the first half of the instruction is ready to issue. In the illustrated embodiment, dependency matrix 204 includes a reset register 205 configured to reset a column of dependency matrix 204 when the source corresponding to that column is ready (e.g., when the instruction in the corresponding issue queue slot executes).

In the illustrated embodiment, dispatch forwards the second half of the instruction dependency information, the ITAG information of the first half of the instruction, and the eligibility information of the second half of the instruction to the second half consumers table 220. The eligibility of the second half of the instruction depends on the issuance of the first half instruction and in the illustrated embodiment is embodied in eligibility bit of column A 221. Therefore, in one embodiment, dispatch initially sets the eligibility bit to '0'. When the first half instruction issues, the second half consumers table sets the eligibility bit to "1", indicating that the second half of the instruction is now eligible for issue.

When the eligibility bit of column A 221 is set, the second half of the instruction issues speculatively. The system then checks column REG 222 to determine which source register the second half of the instruction depends on. The system then checks register scoreboard 230 to determine whether the determined source register is available. If the determined source register is available, then the second half instruction of the instruction executes, and issue queue 210 de-allocates the associated slot in issue queue 210.

Figure 3:
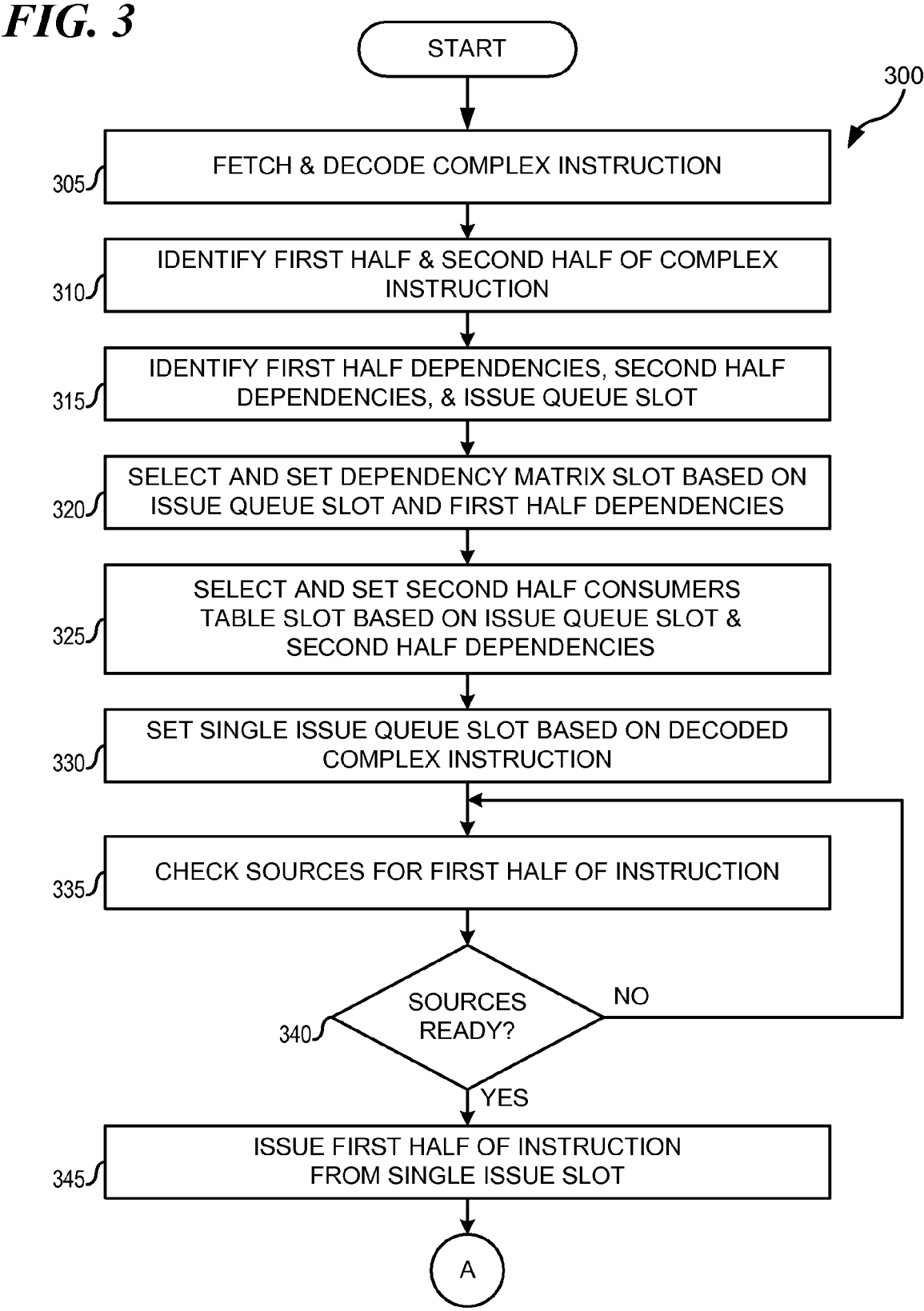
FIG. 3 illustrates a high-level flow diagram depicting logical operational steps of an improved double-issue complex instruction method, which can be implemented in accordance with a preferred embodiment.
Figure 4:
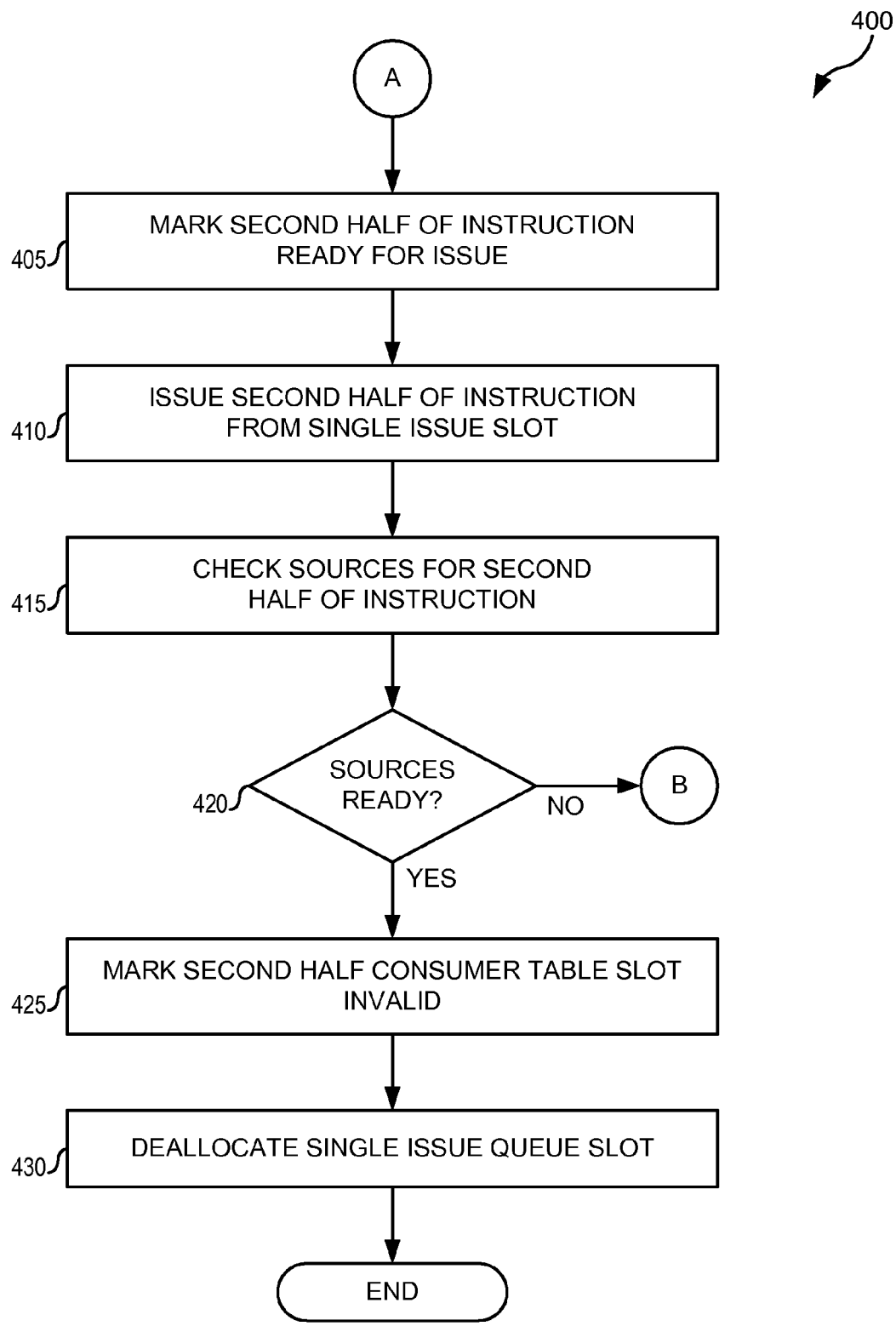
FIG. 4 illustrates a high-level flow diagram depicting logical operational steps of an improved double-issue complex instruction method, which can be implemented in accordance with a preferred embodiment.
Figure 5:
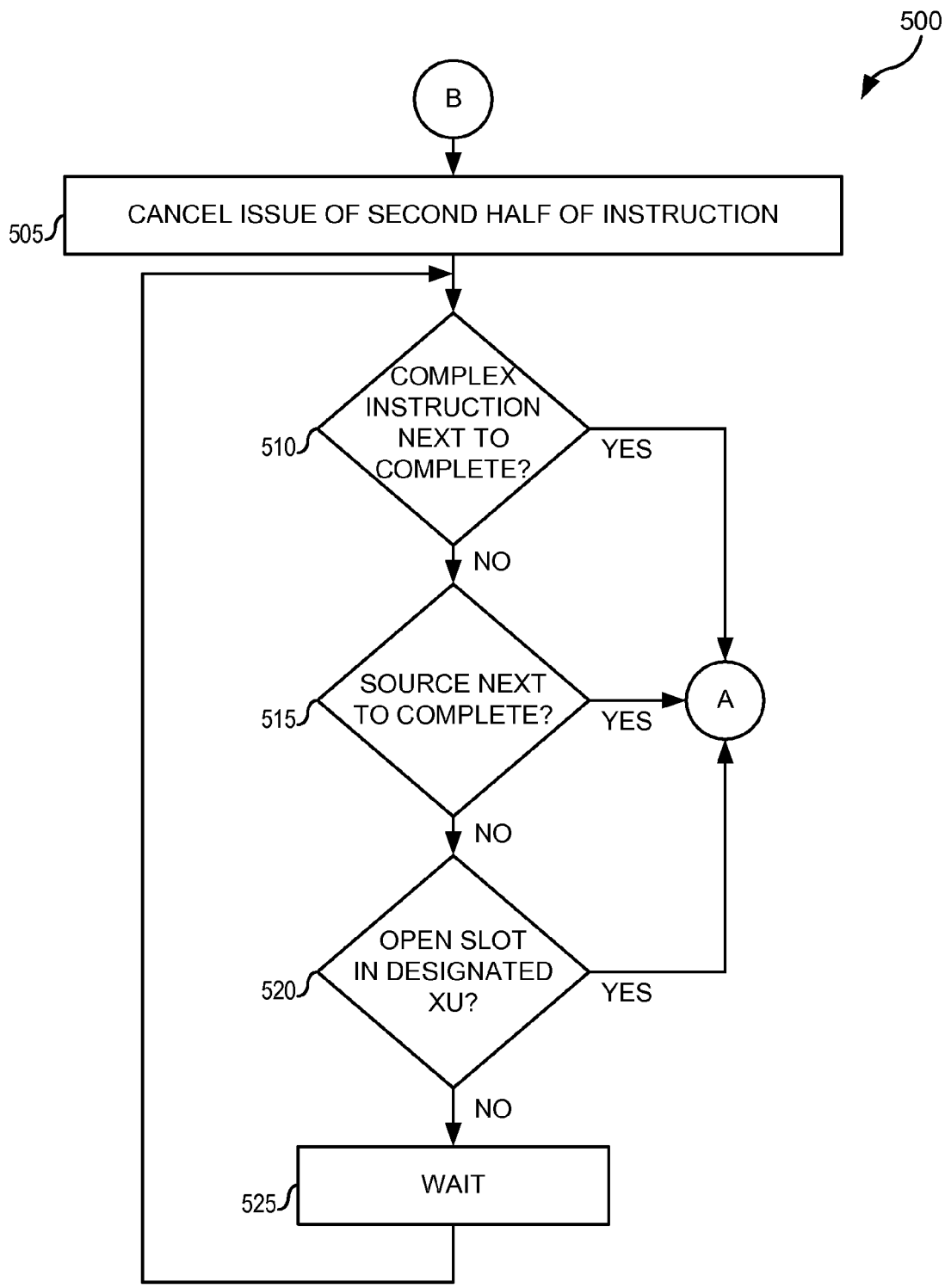
FIG. 5 illustrates a high-level flow diagram depicting logical operational steps of an improved double-issue complex instruction method, which can be implemented in accordance with a preferred embodiment.

If the determined source register is not available, system 200 squashes execution of the second half of the instruction and marks the second half of the instruction for re-issue at a later time. Generally, in one embodiment, the second half of the instruction re-issues at a later time in one of three ways, as described above. FIG. 3, FIG. 4, and FIG. 5 describe an exemplary sequence of operations, in accordance with one embodiment.

Specifically, FIG. 3, FIG. 4, and FIG. 5 illustrate a high-level flow chart 300, 400 and 500 respectively, that depicts logical operation steps performed by, for example, system 100 of FIG. 1, which may be implemented in accordance with a preferred embodiment.

As indicated at block 305, the process begins, wherein system 100 fetches and decodes a complex instruction. For example, IF/ID module 102 fetches and decodes a complex instruction. One skilled in the art will understand that while the steps described here are described with respect to a complex instruction, system 100 can also process simple instructions. Next, as indicated at block 310, system 100 identifies a first half and a second half of a complex instruction. For example, dependency checker 104 identifies a first half and a second half of a complex instruction.

Next, as indicated at block 315, system 100 identifies dependencies in the first half of the instruction, dependencies in the second half of the instruction, and the issue queue slot. System 100 also forwards the complex instruction to the determined issue queue slot. For example, dependency checker 104 identifies dependencies in the first half of the instruction, identifies dependencies in the second half of the instruction, identifies the issue queue slot, and forwards the complex instruction to the issue queue 108.

Next, as indicated at block 320, system 100 selects and sets a dependency matrix slot based on the issue queue slot and the first half dependencies. For example, in one embodiment, dependency matrix 204 of FIG. 2 receives the first half dependency information and the associated issue queue slot position from dependency checker 104 of system 100. Dependency matrix 204 assigns the dependency information to the row associated with the slot in issue queue 210.

Next, as indicated at block 325, system 100 selects and sets a second half consumers table slot based on the slot the instruction is assigned to in the issue queue. System 100 also forwards second half dependency information to the second half consumers table. For example, in one embodiment, second half consumers table 220 receives the second half dependency information, the ITAG information of the first half of the instruction, the eligibility information, and the associated queue slot position from dependency checker 104 of system 100. Based on the issue queue slot position, consumers table 220 assigns the second half dependency information, the ITAG information of the first half of the instruction, and the eligibility information to the corresponding slot of second half consumers table 220.

Next, as indicated at block 330, system 100 sets a single issue queue slot based on the instruction decoded by the IF/ID module. For example, issue queue 108 receives the instruction and the identity of the issue slot from dependency checker 104. Based on the identity of the issue slot, issue queue 108 assigns the instruction to the appropriate slot. In an alternate embodiment, issue queue receives the instruction and selects an available slot, reporting the selected slot to dependency checker 104. One skilled in the art will appreciate that the first half of the instruction and the second half of the instruction both issue from the complex instruction occupying a single issue queue slot.

The order in which certain blocks, such as blocks 320, 325, and 330, are performed is not definite, and the steps can be configured to perform in any order. In one embodiment, the steps of block 320, 325, and 330 are performed in the order in which they are presently described. In another embodiment, the steps of block 320, 325, and 330 are performed in reverse order.

Next, as indicated at block 335, system 100 checks the availability of the sources for the first half instruction. For example, in one embodiment, issue queue 108 checks dependency matrix 204 for any remaining dependencies, in an otherwise conventional manner. In another embodiment, issue queue 108 uses, in an otherwise conventional manner, both dependency matrix 204 and register scoreboard 110 to check for any remaining dependencies.

Next, as indicated at decisional block 340, system 100 determines whether the first half sources are available. If at decisional block 340 the first half sources are not available, the process continues along the NO branch, returning to block 335, wherein system 100 checks source availability. If at decisional block 340 the first half sources are available, the process continues along the YES branch to block 345.

Next, as indicated at block 345, system 100 issues the first half of the instruction from the single issue slot. For example, if dependency matrix 106 indicates no remaining dependencies, issue queue 108 issues the first half of the instruction from the single issue slot. The process continues to marker "A" of FIG. 4, and then to block 405.

Next, as indicated at block 405, system 100 marks the second half of the instruction as ready for issue. For example, system 100 can be configured to include one or more components of system 200 of FIG. 2. In one embodiment, issue queue 108 marks the second half of the instruction in the single issue slot for issue and second half consumers table 220 changes the bit of column A 221 to indicate that the second half of the instruction is eligible for issue. Next, as indicated at block 410, system 100 issues the second half of the instruction from the single issue slot. For example, issue queue 108 issues the second half of the instruction.

Next, as indicated at block 415, system 100 checks the sources for the second half of the instruction. For example, issue queue 108 checks second half consumers table 112 to determine the second half sources. Issue queue 108 then checks register scoreboard 110 for the availability of the second half sources.

Next, as indicated at block 420, system 100 determines whether the second half sources are ready. If at decisional block 420 the second half sources are ready, the process continues along the YES branch to block 425.

Next, as indicated at block 425, system 100 marks the second half consumers table slot invalid. For example, in one embodiment, second half consumers table 220 invalidates the slot where the second half instruction dependency information, the eligibility information, and the ITAG information of the first half of the instruction were stored.

Next, as indicated at block 430, system 100 deallocates the single issue slot in the issue queue and the process ends. For example, in one embodiment, issue queue 210 deallocates the single issue slot where the instruction was stored.

If at decisional block 420 the second half sources are not available, the process continues along the NO branch to marker "B" of FIG. 5, and then to block 505. Next, as indicated at block 505, system 100 cancels the issuance of second half of the instruction. For example, if the second half sources are not ready, issue queue 108 squashes the issuance of the second half of the instruction. In one embodiment, issue queue 108 cancels the issuance of the second half of the instruction by squashing execution of the second half of the instruction.

Next, as indicated at decisional block 510, system 100 determines whether the complex instruction is next to complete (NTC). For example, issue queue 108 determines if the ITAG of the complex instruction is NTC. If the complex instruction is NTC, then the complex instruction is the oldest instruction in issue queue 108 and all sources are therefore available. If at decisional block 510 the complex instruction is NTC, the process continues along the YES branch to marker A of FIG. 4, returning to block 405, described above.

If at decisional block 510 the complex instruction is not NTC, the process continues along the NO branch to decisional block 515. Next, as indicated at decisional block 515, system 100 determines whether the source upon which the second half of the instruction depends is NTC. For example, in one embodiment, ITAG/NTC comparator 114 compares the ITAG information of the NTC in issue queue 108 with the ITAG information associated with the second half of the instruction in column ITAG 223 in second half consumers table 220. If at decisional block 515 the source upon which the second half of the instruction depends is NTC, the process continues along the YES branch to marker "A" of FIG. 4, returning to block 405, described above.

If at decisional block 520 the source upon which the second half of the instruction depends is not NTC, the process continues along the NO branch to decisional block 520. Next, as indicated at decisional block 520, system 100 checks for an open slot in the issue port designated for the second half of the instruction. For example, issue queue 108 determines whether there is an available slot in an issue port 120. If at decisional block 520 there is an available issue port, the process continues along the YES branch to marker "A" of FIG. 4, returning to block 405, described above.

If at decisional block 520 the issue port designated for the second half of the instruction does not have an open slot, the process continues along the NO branch to block 525. Next, as indicated at block 525, system 100 waits, returning to decisional block 510, and the process continues as described above.

Accordingly, the disclosed embodiments provide numerous advantages over other methods and systems. For example, the embodiments disclosed herein are generally faster and more efficient than conventional systems employing dependency matrices, because the instructions are not reinserted into the dependency matrix and issue queue each time that the instruction must issue. Additionally, in the illustrated embodiments, the instructions are not cracked into separate instructions. This removes the need to overwrite the dependency matrix for the second instruction of the cracked pair. The illustrated embodiments also eliminate the need for extra compares necessary to execute the second instruction. The illustrated embodiments also free additional slots in the issue queue by not cracking the instruction, which improves performance. Thus, a system employing the illustrated embodiments can generally perform a series of instructions faster and with fewer resources than conventional methods employing dependency matrices.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

One skilled in the art will appreciate that variations of the above-disclosed and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A method, comprising:
receiving a complex instruction comprising a first portion and a second portion;
setting an issue queue slot for the complex instruction;
allocating an execution unit for execution of the complex instruction;
identifying first portion dependencies in the first portion;

identifying second portion dependencies in the second portion;

setting a dependency matrix slot based on the issue queue slot, the first portion, and the first portion dependencies;

setting a consumers table slot based on the issue queue slot, the second portion, and the second portion dependencies;

determining whether the first portion dependencies have been satisfied;

in the event the first portion dependencies have been satisfied, issuing the first portion from the issue queue slot;

marking the second portion as ready for issue;

issuing the second portion for execution from the issue queue slot;

determining whether the second portion dependencies have been satisfied; and in the event the second portion dependencies have not been satisfied, cancelling the second portion execution.

2. The method of claim 1, further comprising, in the event the second portion dependencies have been satisfied:

marking the consumers table slot as invalid; and deallocating the issue queue slot.

3. The method of claim 1, further comprising, in the event the second portion dependencies have not been satisfied:

determining whether the complex instruction is next to complete; and in the event the complex instruction is next to complete, reissuing the second portion for execution from the issue queue slot.

4. The method of claim 1, further comprising, in the event the second portion dependencies have not been satisfied:

determining whether there is an open execution slot in the execution unit; and in the event there is an open execution slot in the execution unit, reissuing the second portion for execution from the issue queue slot.

5. The method of claim 1, further comprising, in the event the second portion dependencies have not been satisfied:

determining whether a source instruction satisfying the second portion dependencies is next to complete; and in the event the source instruction satisfying the second portion dependencies is next to complete, reissuing the second portion for execution from the issue queue slot.

6. The method of claim 5, wherein determining whether a source instruction satisfying the second portion dependencies is next to complete comprises comparing an instruction tag (ITAG) for the source instruction with an ITAG for the next to complete instruction.

7. The method of claim 1, wherein determining whether the second portion dependencies have been satisfied comprises reading a register scoreboard.

8. The method of claim 1, wherein setting an issue queue slot for the complex instruction comprises not cracking the instruction into multiple instructions.

9. A computer program product for double issue complex instructions, the computer program product comprising:

a non-transitory computer usable medium having computer useable program code embodied therewith, the computer useable program code comprising:

computer useable program code configured to receive a complex instruction comprising a first portion and a second portion;

computer useable program code configured to set an issue queue slot for the complex instruction;

computer useable program code configured to allocate an execution unit for execution of the complex instruction;

computer useable program code configured to identify first portion dependencies in the first portion;

computer useable program code configured to identify second portion dependencies in the second portion;

computer useable program code configured to set a dependency matrix slot based on the issue queue slot, the first portion, and the first portion dependencies;

computer useable program code configured to set a consumers table slot based on the issue queue slot, the second portion, and the second portion dependencies;

computer useable program code configured to determine whether the first portion dependencies have been satisfied;

computer useable program code configured to, in the event the first portion dependencies have been satisfied, issue the first portion from the issue queue slot;

computer useable program code configured to mark the second portion as ready for issue;

computer useable program code configured to issue the second portion for execution from the issue queue slot;

computer useable program code configured to determine whether the second portion dependencies have been satisfied; and computer useable program code configured to, in the event the second portion dependencies have not been satisfied, cancel the second portion execution.

10. The computer program product of claim 9, further comprising:

computer useable program code configured to, in the event the second portion dependencies have been satisfied:

mark the consumers table slot as invalid; and deallocate the issue queue slot.

11. The computer program product of claim 9, further comprising:

computer useable program code configured to, in the event the second portion dependencies have not been satisfied:

determine whether the complex instruction is next to complete; and in the event the complex instruction is next to complete, reissue the second portion for execution from the issue queue slot.

12. The computer program product of claim 9, further comprising:

computer useable program code configured to, in the event the second portion dependencies have not been satisfied:

determine whether there is an open execution slot in the execution unit; and in the event there is an open execution slot in the execution unit, reissue the second portion for execution from the issue queue slot.

13. The computer program product of claim 9, further comprising:

computer useable program code configured to, in the event the second portion dependencies have not been satisfied:

determine whether a source instruction satisfying the second portion dependencies is next to complete; and in the event the source instruction satisfying the second portion dependencies is next to complete, reissue the second portion for execution from the issue queue slot.

14. The computer program product of claim 13, wherein determining whether a source instruction satisfying the second portion dependencies is next to complete comprises comparing an instruction tag (ITAG) for the source instruction with an ITAG for the next to complete instruction.

15. The computer program product of claim 9, wherein determining whether the second portion dependencies have been satisfied comprises reading a register scoreboard.

16. The computer program product of claim 9, wherein setting an issue queue slot for the complex instruction comprises not cracking the instruction into multiple instructions.

17. A computer program product for double issue complex instructions, the computer program product comprising:
- a non-transitory computer usable medium having computer useable program code embodied therewith, the computer useable program code comprising:
- computer useable program code configured to receive a complex instruction comprising a first portion and a second portion;
- computer useable program code configured to set an issue queue slot for the complex instruction;
- computer useable program code configured to allocate an execution unit for execution of the complex instruction;
- computer useable program code configured to identify first portion dependencies in the first portion;
- computer useable program code configured to identify second portion dependencies in the second portion;
- computer useable program code configured to set a dependency matrix slot based on the issue queue slot, the first portion, and the first portion dependencies;
- computer useable program code configured to set a consumers table slot based on the issue queue slot, the second portion, and the second portion dependencies;
- computer useable program code configured to determine whether the first portion dependencies have been satisfied;
- computer useable program code configured to, in the event the first portion dependencies have been satisfied, issue the first portion from the issue queue slot;
- computer useable program code configured to mark the second portion as ready for issue;
- computer useable program code configured to issue the second portion for execution from the issue queue slot;
- computer useable program code configured to determine whether the second portion dependencies have been satisfied;
- computer useable program code configured to, in the event the second portion dependencies have been satisfied, mark the consumers table slot as invalid and deallocating the issue queue slot;
- computer useable program code configured to, in the event the second portion dependencies have not been satisfied, cancel the second portion execution;
- computer useable program code configured to determine whether the complex instruction is next to complete;
- computer useable program code configured to, in the event the complex instruction is next to complete, reissue the second portion for execution from the issue queue slot;
- computer useable program code configured to determine whether there is an open execution slot in the execution unit;
- computer useable program code configured to, in the event there is an open execution slot in the execution unit, reissue the second portion for execution from the issue queue slot;
- computer useable program code configured to determine whether a source instruction satisfying the second portion dependencies is next to complete; and
- computer useable program code configured to, in the event the source instruction satisfying the second portion dependencies is next to complete, reissue the second portion for execution from the issue queue slot.

18. The computer program product of claim 17, wherein the computer useable program code configured to determine whether the first portion dependencies have been satisfied comprises a computer useable program code configured to read a dependency matrix.

19. The computer program product of claim 17, wherein the computer useable program code configured to determine whether the second portion dependencies have been satisfied comprises computer useable program code configured to read a register scoreboard.

20. The computer program product of claim 17, wherein each complex instruction issues from a single issue slot as a single instruction.

* * * * *